L. THARP.
AUTOMOBILE WHEEL GAUGE.
APPLICATION FILED MAR. 4, 1922.
1,438,346.
Patented Dec. 12, 1922.
2 SHEETS—SHEET 1.
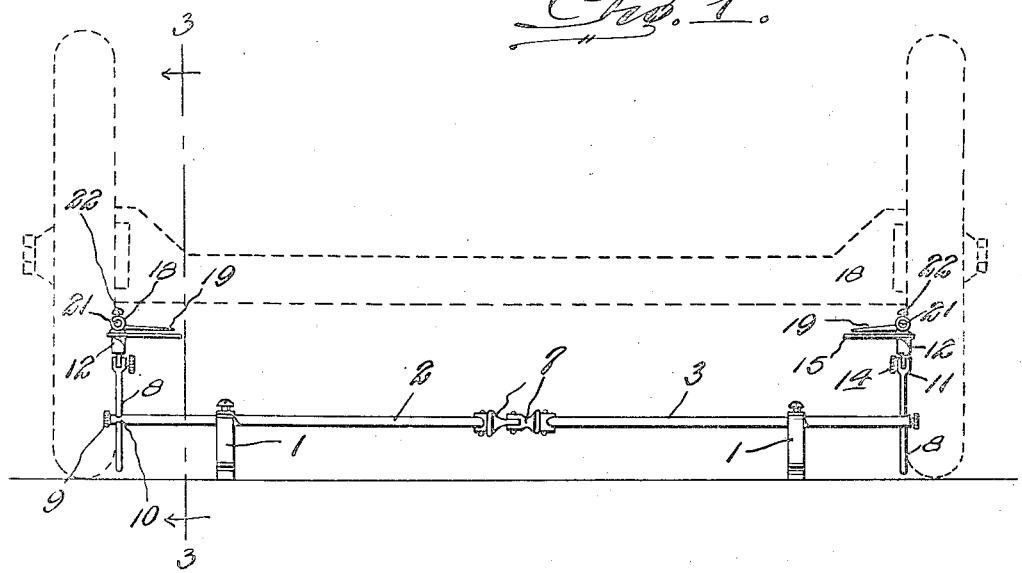
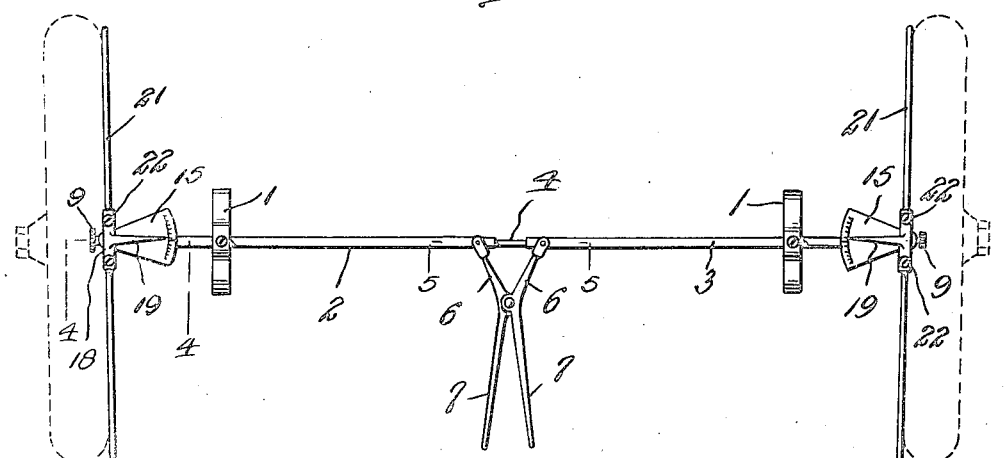
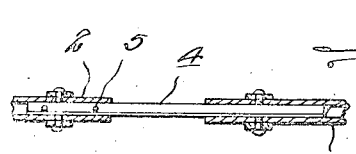
Inventor
Lee Tharp.

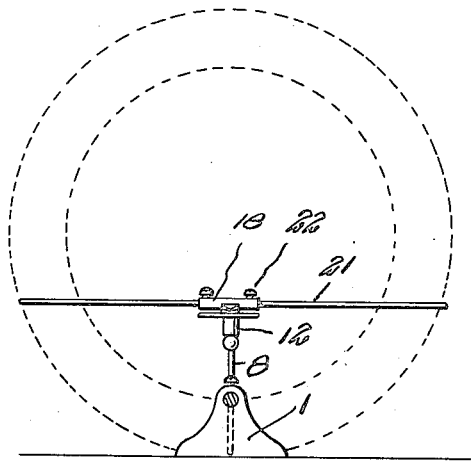
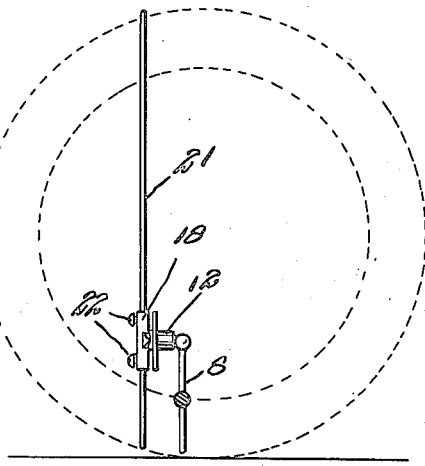
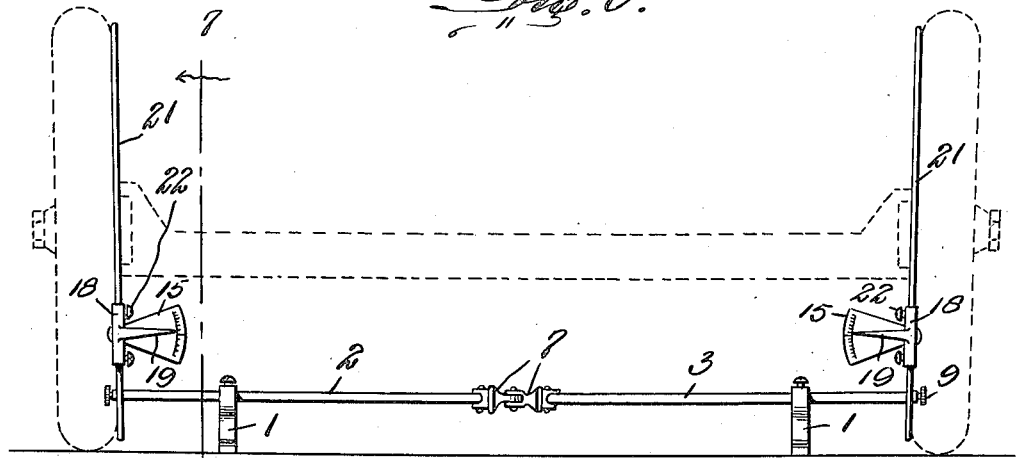
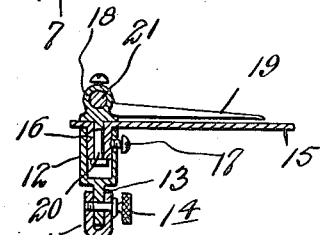

Patented Dec. 12, 1922.

1,438,346

UNITED STATES PATENT OFFICE.

LEE THARP, OF BURLINGTON, IOWA.

AUTOMOBILE WHEEL GAUGE.

Application filed March 4, 1922. Serial No. 540,953.

*To all whom it may concern:*

Be it known that I, LEE THARP, a citizen of the United States, residing at Burlington, in the county of Van Buren and State of Iowa, have invented new and useful Improvements in Automobile Wheel Gauges, of which the following is a specification.

The object of my said invention is the provision of an easily manipulated and otherwise advantageous gauge for indicating the "toe in" of the front wheels of automobiles, the wheels being gauged separately, and for testing wheels for chamfer or to ascertain whether or not the axle bearing the wheels is bent, the wheels in this practice being also gauged separately.

To the attainment of the foregoing, the invention consists in the improvement as hereinafter described and definitely claimed.

In the accompanying drawings, forming part of this specification:—

Figure 1 is a front elevation showing the positioning of the gauge for ascertaining the "toe in" of front wheels.

Figure 2 is a top plan of the same.

Figure 3 is a vertical section taken in the plane indicated by the line 3—3 of Figure 1.

Figure 4 is an enlarged detail section on the line 4—4 of Figure 2.

Figure 5 is an enlarged detail section on the line 5—5 of Figure 2.

Figure 6 is a front elevation showing the gauge arranged to test the wheels for chamfer or to determine whether or not the axle is bent.

Figure 7 is a vertical section taken in the plane indicated by the line 7—7 of Figure 6.

Similar numerals of reference designate corresponding parts in all of the views of the drawings.

Among other elements my novel gauge comprises standards 1 adapted to rest on a floor, pavement or other support. Extending through and fixed to the standards 1 are rods 2 and 3, movable endwise in opposite directions and held in alinement with each other by a rod 4, fixed at 5 in the rod 2 and telescoped in the rod 3, Figure 5.

Connected in pivotal manner to the inner portions of the rods 2 and 3 are the inner arms 6 of hand levers 7.

Each of the rods 2 and 3 is provided near its outer end with the equipment best shown at the left of Figure 1 and in Figure 4. The said equipment comprises a rod-like member 8, adjustably fixed by a set screw 9 in an aperture 10 of the rod 2 and bifurcated at one end, as indicated by 11, a socket member 12 having a reduced portion 13 pivoted in said bifurcation 11 by a thumb screw 14 and adapted to be adjustably fixed by the tightening of said screw, a graduated dial-plate 15 having a projection 16 secured in the socket member 12 by a set screw 17 or other appropriate means, a sleeve 18 bearing against the face of the dial-plate 15 and having a pointer 19 and also having a journal 20 secured in the said dial plate and projection 16 thereof, and a gauge rod 21 secured by set screws 22 or other appropriate means in the sleeve 18.

To ascertain the extent to which the front wheels of an automobile "toe in," the gauge is positioned relative to the front wheels as shown in Figures 1, 2 and 3, and the handles 7 are moved toward each other until the gauge rods 21 touch the wheel tires at the front and rear thereof, when the pointers 19 in cooperation with the appropriately graduated dials or scales on the plates 15 will indicate the extent to which the wheels "toe in." It will also be noted that each of the wheels is gauged independently of the other.

To test wheels for chamfer or to ascertain whether or not an axle is bent, the gauge is arranged as shown in Figures 6 and 7—i. e., the socket members 12 are disposed horizontally and the gauge rods 21 are disposed vertically.

In virtue of the rod-like members 8 being vertically adjustable in the rods 2 and 3, it will be manifest that the gauge can be placed under brake drums, and can be readily suited for the gauging of wheels on axles of various heights.

I have entered into a detailed description of the construction and relative arrangement of the parts embraced in the present and preferred embodiment of my invention in order to impart a full, clear, and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A wheel gauge comprising scale-bearing plates swinging pointers connected with and adapted to cooperate with said plates, gauge-rods connected and movable with the pointers and adapted to be pressed against wheels, and hand levers and rods in connection with the said hand levers and gauge rods for so pressing the gauge rods; the plates, pointers and gauge rods being adjustable from a horizontal position to a vertical position and vice versa.

2. In a wheel gauge, the combination of a scale-bearing plate, a pointer movable relative thereto, and a gauge rod connected to and movable with the pointer and adapted to be pressed against the side of a wheel, with an upright, and a member adjustably connected to said upright and carrying the plate, the pointer and the gauge rod; the pointer having a sleeve in which the gauge rod is held, the plate having a projection socketed and secured in said adjustably-connected member, and the sleeve having a stem journaled in said projection.

In testimony whereof I affix my signature.

LEE THARP.